(12) United States Patent
Hrle et al.

(10) Patent No.: US 7,080,074 B2
(45) Date of Patent: Jul. 18, 2006

(54) METHOD AND SYSTEM FOR REDUCED LOCK CONTENTION IN SQL TRANSACTIONS

(75) Inventors: Namik Hrle, Boeblingen (DE); Andreas R. Maier, Stuttgart (DE); James Zu-Chia Teng, San Jose, CA (US); Julie A. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/010,371

(22) Filed: Nov. 5, 2001

(65) Prior Publication Data
US 2002/0091694 A1    Jul. 11, 2002

(30) Foreign Application Priority Data
Nov. 8, 2000    (EP) .................................. 00124197

(51) Int. Cl.
*G06F 17/30* (2006.01)
(52) U.S. Cl. .............................. 707/8; 707/10; 707/100; 707/200
(58) Field of Classification Search ............. 707/1–206
See application file for complete search history.

(56) References Cited

U.S. PATENT DOCUMENTS

| 6,606,626 B1* | 8/2003 | Ponnekanti ..................... 707/8 |
| 2002/0038313 A1* | 3/2002 | Klein et al. .................. 707/200 |

* cited by examiner

*Primary Examiner*—Charles Rones
*Assistant Examiner*—Belix M. Ortiz
(74) *Attorney, Agent, or Firm*—Sawyer Law Group LLP

(57) ABSTRACT

According to the method, apparatus, and computer readable medium of the present invention, a scan is performed by accessing all rows of a table in a relational database, evaluating each row to determine whether the row satifies a set of predicates of a database query, and returning the row if it satisfies the set of predicates. According to a preferred embodiment of the present invention, all rows are evaluated regardless of current locks. The scan is continued if the row does not satisfy the set of predicates regardless of the current lock on the row. The locking semantics according to the invention has the advantage that it completely removes the problem of lock contention on the rows that do not satisfy statement predicates.

15 Claims, 3 Drawing Sheets

METHOD AND SYSTEM FOR REDUCED LOCK CONTENTION IN SQL TRANSACTIONS

CROSS-REFERENCE TO RELATED APPLICATIONS

This application claims benefit under 35 USC 119 of European Application No. 00124197.5 filed on Nov. 8, 2000.

BACKGROUND OF INVENTION

The present invention relates to database management systems and more particularly to improving throughput of transactions by reducing lock contention of concurrent transactions on the rows of a table in a relational data base system.

The rules that influence SQL result set creation semantics are defined in the SQL standard (ANSI Document X3.135-1986, "Database Language SQL, American Standards Institute, New York, 1986; ISO Document ISO/TC 97/SC, 21/WG 3, N 117). These rules comprise locking isolation levels which determine when an application program can retrieve data during a transaction. In general, the rules specify whether the result set consists of the committed rows only or whether it can include the rows that were uncommitted at the time of result set creation. Typical examples of the former are Cursor Stability (CS) and Read Stability (RS), and for the later Uncommitted Read (UR).

Many applications require committed read semantics which inevitably comes with the price of increased locking contention. In order to return a committed row the transaction might need to acquire a lock on it that is incompatible with locks requested by other concurrent transactions. With the known locking semantics the committed read transactions might requests and held locks even on the rows that do not qualify for the result set by means of the statement predicates. Apart from the overhead of acquiring and releasing these seemingly unnecessary locks this behavior increases the number of lock request suspensions and in some cases results in deadlocks and abnormal transaction terminations.

Accordingly, what is needed is a system and method for improving the throughput of transactions. In particular, what is needed is a system and method for reducing lock contentions in operations that require committed read semantics, and reducing deadlock situations in transactions. The present invention addresses such a need.

BRIEF SUMMARY OF THE INVENTION

The present invention is directed to a method, apparatus and computer readable medium for reducing lock contention of concurrent transactions. According to the invention, a scan is performed by accessing all rows of a table in a relational database, evaluating each row to determine whether the row satisfies the predicates of a database query, and returning the row if it satifies the predicates of the query. According to a preferred embodiment of the present invention, all rows are evaluated regardless of current locks. The scan is continued if the row does not satisfy the predicates of the query. A lock is requested if the row satisfies the predicates of the query, and the scan is suspended if the requested lock is refused. The request is repeated and the row is re-evaluated when the lock is permitted. If the row still satisfies the predicates of the query, it is returned. If the row no longer satifies the predicates of the query, the lock is released, the row is skipped and the scan is continued.

The locking semantics according to the invention has the advantage that it completely removes the problem of lock contention on the rows that do not satisfy query predicates. The improved semantics of forming the result set is more strict than the Uncommitted Read (UR) mode because it returns only committed rows, but is less strict than Cursor Stability (CS) and Read Stability (RS) because in some special cases the rows that would be returned by CS and RS as committed would not be part of the result set.

BRIEF DESCRIPTION OF THE SEVERAL VIEWS OF THE DRAWING(S)

DETAILED DESCRIPTION OF THE INVENTION

Figure 1:
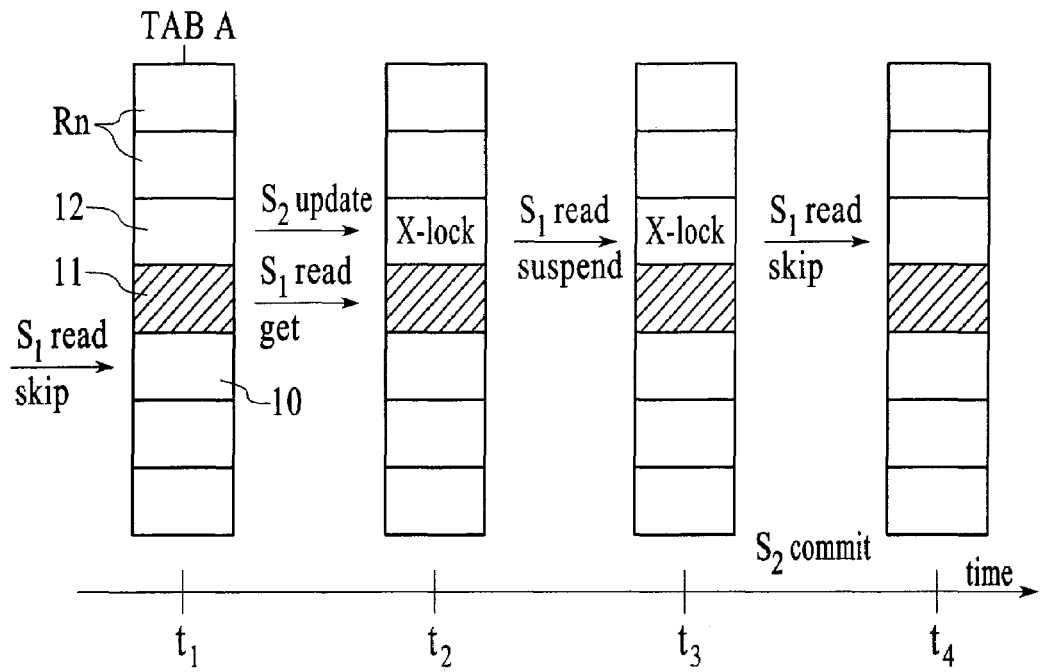
FIG. 1 shows an example of the access to a table using the conventional read semantic rules.

The present invention relates to improving the throughput of transactions. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The embodiments of the invention described herein relate to a relational database operated by a database management system (DBMS) by using the well known Structured Query Language called SQL. The DBMS supports a plurality of application programs which may simultaneously request access to the database. It is one of the functions of the DBMS to coordinate transactions initiated by the application programs, and to avoid interferences between them. The access to the data base is performed by using the SQL Standards which provide a variety of statements including search conditions or predicates which allow a user to define certain data items in the database. One of these statements is the Select Statement which produces a result set of data according to the search conditions or predicates.

The invention introduces improved semantics to create result sets in response to queries directed to the relational database by the use of access statements as defined in the SQL Standards. By the improved semantics, access to a table of the database is performed by a scan of all rows of the table, both committed and uncommitted, regardless of existing locks, and by a return of committed rows which fulfill the query predicates. While both committed and uncommitted rows are scanned, the entire table need not necessarily be scanned. This still depends on the selected access path and is transparent to the new semantics.

The algorithm that describes the improved semantics comprise the following rules:

1. The rows of a table are scanned with uncommitted read semantics.

2. If a row does not satisfy the predicates, it is skipped and the scan is continued, else an appropriate lock is requested.

3. If the requested lock is refused, the scan is suspended. Once the suspension is lifted, the row is re-evaluated to confirm that the row still satisfies the predicates.

4. If the row no longersatisfies the predicates, the lock is released, the row is skipped and the scan is continued. Otherwise, the row is returned as part of the result set and the scan is continued.

All rows of the result set are committed rows. Locks on rows that do not satisfy the predicates are neither requested nor acquired, which eliminates the situations where the lock requester waits for a lock on the row that is not needed and avoids situations where the lock holder blocks other transactions by holding a lock on the row that is not part of the holder's result set.

The result sets created by the existing semantical rules and the semantical rules according to the invention are in most cases the same. There is one exception which is demonstrated by the following sequence of events.

The scan needs to visit a number of rows and it starts scanning at the time when a row R, that yet needs to be scanned, satisfies the predicates. Before the scan reaches row R, another transaction changes its contents so that row R no longer satisfies the predicates used by the scan. This row updating transaction has not yet become committed. At this point in time the scan comes to row R and skips it because it does not satisfy the predicates used by the scan. Thereafter, for some reason, the updating transaction backs out the changes to row R so that it would now satisfy the predicates used by the scan. The row R would thus not be part of the result set that is created by the scan although it satisfies the predicates.

In general, the new semantics provide the same rules for the result set creation as the known isolation level semantics including the Cursor Stability mode or the Read Stability mode, with the exception of the special case described above. There are many applications that can tolerate these exceptions for the benefit of significantly reduced lock contention.

An appropriate implementation of the new semantics is a modification of the known committed read isolation levels because it does not change their 'repeatability' attribute, but rather changes the way the result set is constructed.

Figure 2:
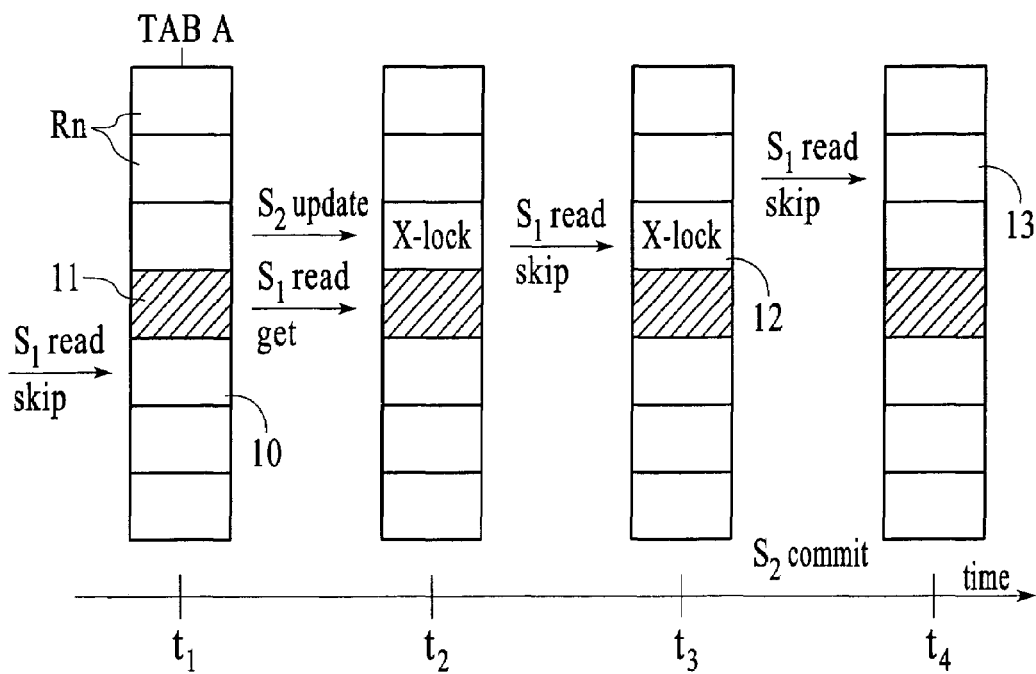
FIG. 2 shows the example from FIG. 1 by the use of read semantic rules according to the invention.

FIGS. 1 and 2 demonstrate in general the differences between the conventional semantics and the semantics according to the invention. FIG. 1 represents the access to table TAB A by using the conventional semantics. Table TAB A comprises a number of rows $R_n$ and which is accessed by two statements S1 and S2. For a given range, only row 11 satisfies the predicates of statement S1. At time $t_1$, statement S1 reads row 10 adjacent to row 11 and skips it because it does not qualify. At time $t_2$, statement S1 reads the next row, which is row 11, and retrieves it because it qualifies. At the same time statement S2 updates the subsequent row 12 and holds an exclusive lock on this row. At time $t_3$, statement S1 comes to row 12 that is held by statement S2 and thus gets suspended. S1 waits then for S2 to release the lock, even though row 12 does not qualify. At time $t_4$, statement S2 commits and releases the exclusive lock on row 12. Statement S1 then reads row 12 and skips it because it does not qualify.

FIG. 2 represents the scanning with locking semantics according to the invention. The operation at times $t_1$ and $t_2$ is the same as shown in FIG. 1. At time $t_3$, however, when Statement S1 reaches row 12, which is held by statement S2, Statement S1 does not not get suspended. Rather, Statement S1 reads through the exclusive lock held by statement S2 and finds that the row does not qualify and skips it. At time $t_4$, statement S1 is already further in the table by reading row 13. The result set produced by statement S1 is the same as in the conventional semantics, but without locking overhead and contention.

Figure 3:
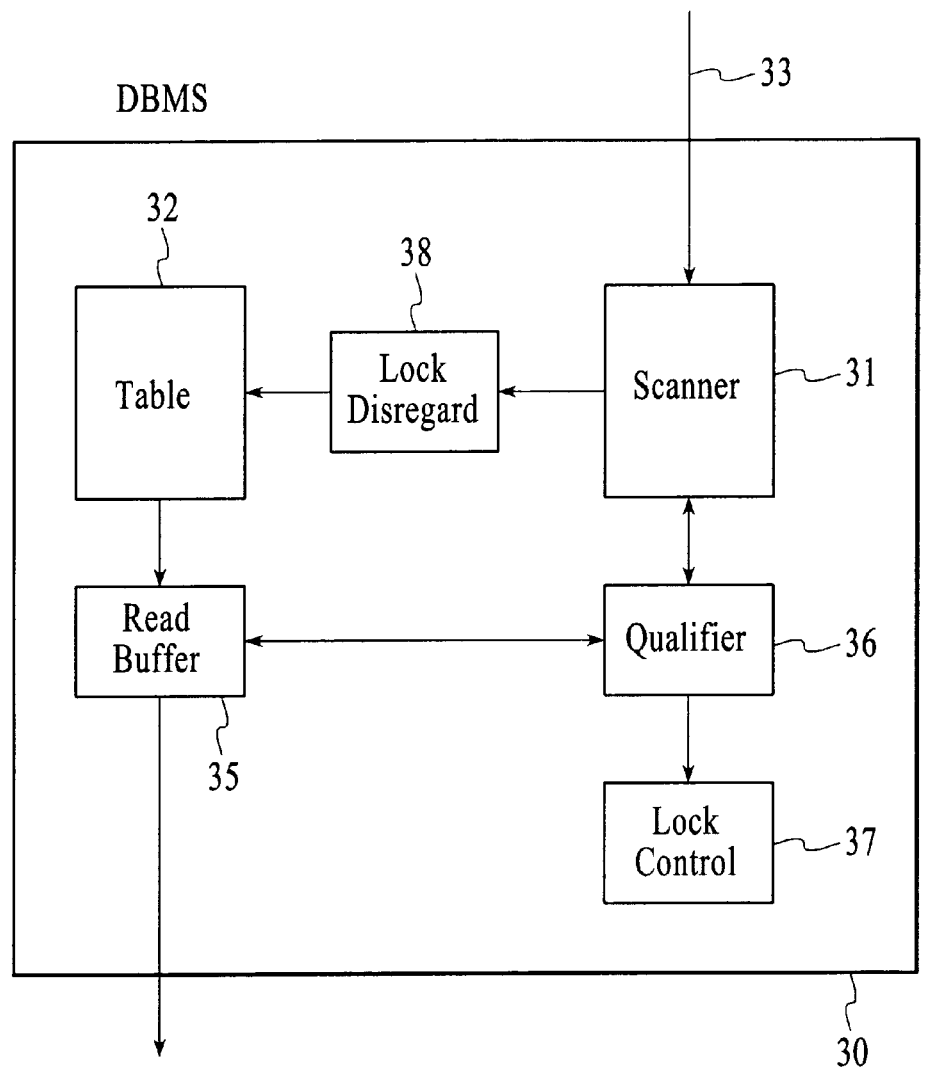
FIG. 3 is a schematic block diagram of a data base management system including apparatus using an implementation of the invention.

FIG. 3 shows an implementation of the invention in a database management system (DBMS) 30 which comprises a scanner 31 and a system of tables 32. The scanner receives Select Statements via line 33 and scans the rows of at least one of the tables 32. A read buffer 35 at the output of the table storage is connected to a qualifying checker 36 which determines whether a row read within the scan operation satisfies the predicates of the SQL statement received on line 33. A lock control device 37 receives an input from the qualifying checker 36 if the later determines that the row satisfies the predicates. The lock control device 37 also receives inputs from other components, not shown in FIG. 3. The scanner 32 is connected to a lock device 38 which disregards pending locks held by other access statements and which permits a read through such locks during the scan of the table 32 as described above with reference to FIG. 2.

Figure 4:
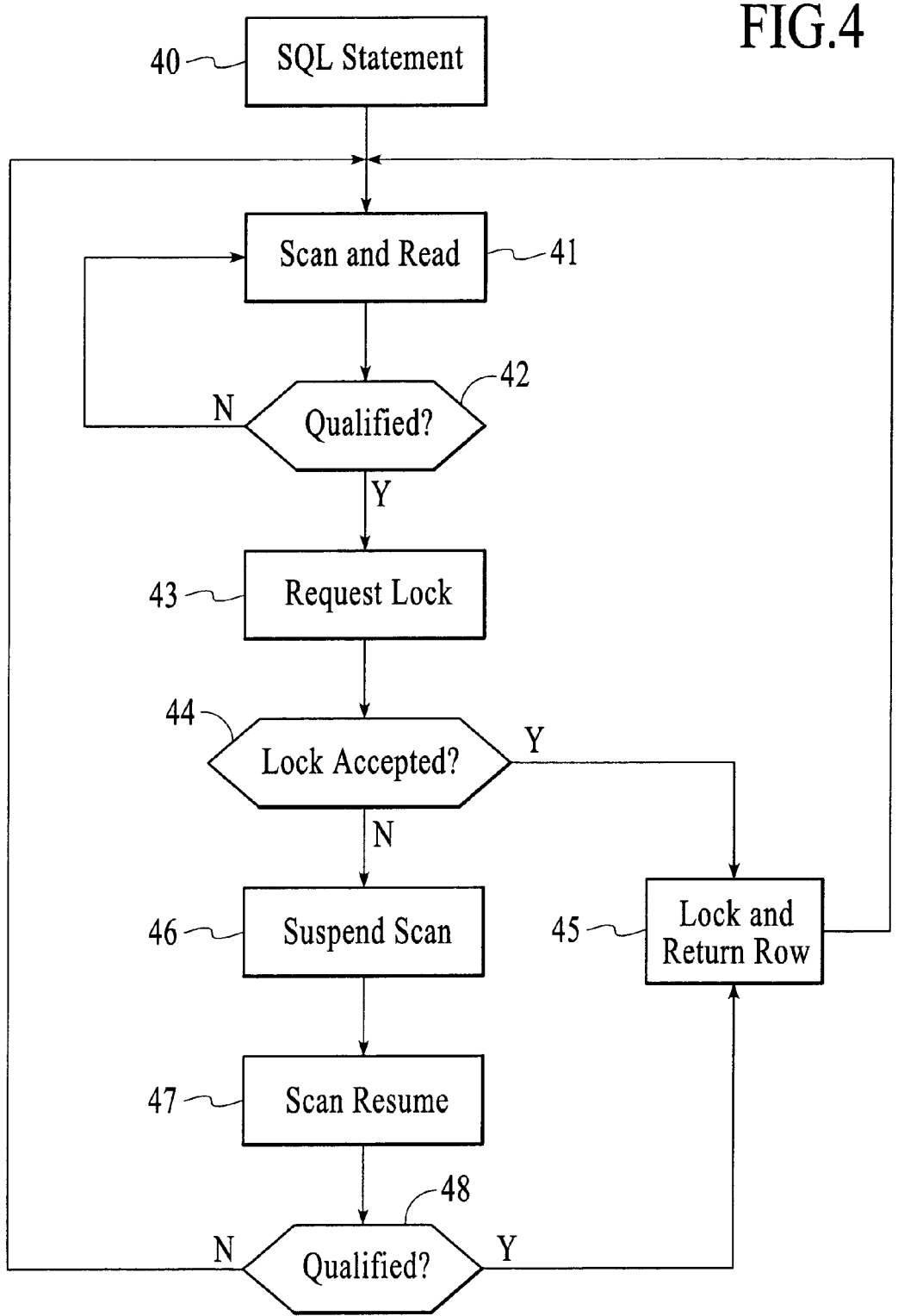
FIG. 4 is a flow diagram of an implementation of a method according to the invention.

FIG. 4 represents the steps of a method to implement the algorithm described above. In step 40 an SQL statement is issued which initiates by step 41 a read scan in a table such as table 32 in FIG. 3. This scan may be performed within an access range determined by the statement. During the scan each row of the table is read and evaluated in step 42 to determine whether the row fulfils the search conditions of the select statement. In the case that it does not satisfy the search conditions, the row is skipped and step 41 is repeated to continue the scan by reading the next row. If the row satifies the search conditions, a lock is requested in step 43. In step 44, it is determined whether the lock is accepted. If the lock is accepted in step 45, the row is returned as a part of the result set of the scan, and the scan continues with the next row until the end of the scan range. If the requested lock is refused (step 44), i.e., a non-compatible lock of another statement is encountered, the scan is suspended in step 46. Subsequently, in step 47, when the blocking lock is released, the scan is resumed. In Step 48, the same row is evaluated again to determine whether it continues to satisfy the predicates. If the row still satisfies the statement predicates, the row is returned as a part of the result set in step 45. If the row no longer satisfies the predicates, it is skipped, and step 41 is repeated to continue the scan.

The method steps described by reference to FIG. 4 may be implemented in a program product which is stored on a machine readable data carrier or transmitted through a digital data network.

EXAMPLE 1

Subsequently, examples are described which show the similarities and the differences of the current isolation level semantics and the semantics according to the invention. The examples use the following table TAB:

TABLE TAB

| Rows  | Column C1 | Column C2 |
|-------|-----------|-----------|
| Row 1 | 3         | A         |
| Row 2 | 5         | B         |
| Row 3 | 10        | C         |

In order to avoid complexity of considering different access paths (which is irrelevant for the presented examples)

it is assumed that all rows need to be examined, i.e. either the statements below use tablespace scan, or use an index scan and end up with the three rows to examine without further index usage.

There are two transactions, TRAN1 and TRAN2 that hold locks on Table TAB. The locks are acquired via the following statements:

TRAN1: UPDATE TAB SET C2=P WHERE C1=3

The result of this statement is an exclusive lock on row1.

TRAN2: UPDATE TAB SET C2=Y WHERE C1=10

The result of this statement is an exclusive lock on row3.

TRAN3: SELECT . . . FROM TAB WHERE C1=10 AND C2=Y

TRAN3 accesses Table TAB by using the known committed read isolation levels semantics. The scan starts by a request of a shared lock on row1 and gets suspended since at that time row1 is exclusively locked.

Once the transaction TRAN1 commits, the shared lock on row1 will be granted to TRAN3. After evaluating the predicates the row will be rejected, but the lock might stay depending on the isolation level and internal database system implementation. The scan continues in the same fashion and reaches row3. A shared lock is requested and the transaction gets suspended. Whether or not row3 gets included in the result set depends on TRAN2 completion. If TRAN2 commits, row3 is in the result set. If it backs out, row3 is not in the result set.

The behavior of TRAN3 is different, if the new semantics is used. The scan starts and rejects row1 and row2 without locking since they do not fulfil the predicates of the Select statement. The scan avoids overhead of acquiring locks on non-qualifying rows, transaction wait due to the lock suspension, potential timeout or deadlock as well as unnecessary locks that stay behind. When the scan reaches row3, TRAN2 already has changed column C2 of this row from 'C' to 'Y'. Thus, row 3 satisfies the predicates of the select statement in TRAN3 so that a shared lock is requested and the transaction gets suspended. After TRAN2 completes, by commit or by backout, the predicates are re-examined. Whether or not row3 gets included in the result set depends on TRAN2 completion. If it commits, row3 is in the result set. If it backs out, row3 is not in the result set. Note that there are no differences in the result sets between the current isolation level semantics and the semantics according to the invention.

EXAMPLE 2

This example relates to the same table TAB. It demonstrates the case where the current isolation level semantics and the semantics according to the invention generate different result sets. The table TAB and the transactions TRAN1 (holding an exclusive lock on row1) and TRAN2 (holding an exclusive lock on row3) are the same.

TRAN3 accesses Table TAB via the statement:

SELECT . . . FROM TAB WHERE C1=10 AND C2=C

TRAN3 uses the existing committed read isolation levels semantics. The scan starts, requests a shared lock on row1 and gets suspended. Once the transaction TRAN1 commits, the shared lock on row1 will be granted to TRAN3. After an evaluation of the predicates the row will be rejected, but the lock might stay depending on the isolation level and internal database system implementation. The scan continues in the same fashion and reaches row3. A shared lock is requested and the transaction gets suspended. Whether or not row3 gets included in the result set depends on TRAN2 completion. If TRAN2 commits, row3 is not in the result set. If it backs out, row3 is in the result set.

The behavior of TRAN3 is now considered if the semantics according to the invention is used. The scan starts and rejects row1 and row2 without locking since they do not satisfy the Select statement. As in example 1, the locking overhead and contentions are avoided. If the scan reaches row3, this row does not qualify (it currently has values C1=10 and C2=Y). Regardless of whether TRAN2 later commits or backs out, the row3 is not included in the result set.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for reducing lock contention of concurrent transactions on a plurality of rows of a table in a relational data base system in response to a database query having a set of predicates, the method comprising the steps of:
   (a) scanning all rows of the table within an access range determined by the query, wherein the scanning step (a) further comprising the step of:
       (a1) accessing the rows of the table with uncommitted read semantics, wherein the accessing is performed through any current locks on the rows;
   (b) evaluating each scanned row to determine whether the row satisfies the set of predicates, wherein the step of evaluating (b) includes
       (b1) determining that a particular row does not satisfy the set of predicates of the query;
       (b2) skipping the particular row, including skipping the particular row when a lock is currently held on the particular row and an update on the particular row has not yet committed while the lock is held, and continuing the scan; and
       (b3) determining that a specific row satisfies the set of predicates of the query and returning the specific row, wherein the step of returning the specific row further comprises
           requesting a lock on the specific row that satisfies the set of predicates;
           suspending the scan, if the requested lock is refused;
           repeating the request for a lock and re-evaluating the specific row when the lock is permitted; and
           returning the specific row if the specific row still satisfies the set of predicates of the query.

2. The method of claim 1, wherein the returning step (b3) further comprises the step of:
   releasing the lock, skipping the specific row, and continuing the scan if the specific row no longer satisfies the set of predicates of the query.

3. The method of claim 1, wherein the returning step (b3) further includes the step of:
   returning the specific row as a result set.

4. The method of claim 1, wherein the returning step (b3) further includes the step of:
   returning the specific row if the specific row is a committed row.

5. The method of claim 1, wherein the database query is a SQL statement.

6. An apparatus for reducing lock contention of concurrent transactions on a plurality of rows of a table in a relational data base system in response to a database query having a set of predicates, comprising:
- means for scanning all rows of the table within an access range determined by the query, wherein means for scanning further comprising:
  - means for accessing the rows of the table with uncommitted read semantics, wherein the accessing is performed through any current locks on the rows;
- means for evaluating each scanned row to determine whether the row satisfies the set of predicates, wherein the means for evaluating includes:
  - means for determining that a particular row does not satisfy the set of predicates of the query; and
  - means for skipping the particular row, including skipping the particular row when a lock is currently held on the particular row and an update on the particular row has not yet committed while the lock is held, and continuing the scan; and
  - means for determining that a specific row satisfies the set of predicates of the query and for returning the row, wherein the means for returning the specific row includes
    - means for requesting a lock on the specific row;
    - means for suspending the scan, if the requested lock is refused;
    - means for repeating the request for a lock and re-evaluating the specific row when the lock is permitted; and
    - means for returning the specific row, if the specific row still satisfies the set of predicates of the query.

7. The apparatus of claim 6, wherein the means for returning further includes means for releasing the lock, skipping the specific row, and continuing the scan, if the specific row no longer satisfies the set of predicates of the query.

8. The apparatus of claim 6, wherein the returned row is returned as a result set.

9. The apparatus of claim 6, wherein the row returned is a committed row.

10. The apparatus of claim 6, wherein the database query is a SQL statement.

11. A computer readable medium containing programming instructions for reducing lock contention of concurrent transactions on a plurality of rows of a table in a relational data base system in response to a database query having a set of predicates, the programming instructions for:

(a) scanning all rows of the table within an access range determined by the query, wherein the scanning instruction (a) further comprising the instruction for:
  (a1) accessing the rows of the table with uncommitted read semantics, wherein the accessing is performed through any current locks on the rows;
(b) evaluating each scanned row to determine whether the row satisfies the set of predicates, wherein the instruction for evaluating (b) further comprises the instructions for:
  (b1) determining that a particular row does not satisfy the set of predicates of the query;
  (b2) skipping the particular row, including skipping the particular row when a lock is currently held on the particular row and an update on the particular row has not yet committed while the lock is held, and continuing the scan; and
  (b3) determining that a specific row satisfies the set of predicates of the query and returning the specific row, wherein the instruction for returning the specific row further comprises the instructions for:
    requesting a lock on the specific row;
    suspending the scan if the requested lock is refused;
    repeating the request for a lock and re-evaluating the specific row when the lock is permitted; and
    returning the specific row if the specific row still satisfies the set of predicates of the query.

12. The computer readable medium of claim 11, wherein the returning instruction (b3) further comprises the instructions for:
releasing the lock, skipping the specific row, and continuing the scan if the specific row no longer satisfies the set of predicates of the query.

13. The computer readable medium of claim 11, wherein the returning instruction (b3) further includes the instruction for:
returning the specific row as a result set.

14. The computer readable medium of claim 11, wherein the returning instruction (b3) further includes the instruction for:
returning the specific row if the row is a committed row.

15. The computer readable medium of claim 11, wherein the database query is a SQL statement.

\* \* \* \* \*